United States Patent
Hiramoto et al.

(10) Patent No.: US 8,589,601 B2
(45) Date of Patent: Nov. 19, 2013

(54) I/O CONTROLLER AND DESCRIPTOR TRANSFER METHOD

(75) Inventors: Shinya Hiramoto, Kawasaki (JP); Yuichiro Ajima, Kawasaki (JP); Tomohiro Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 318 days.

(21) Appl. No.: 12/632,368

(22) Filed: Dec. 7, 2009

(65) Prior Publication Data
US 2010/0198998 A1 Aug. 5, 2010

(30) Foreign Application Priority Data

Jan. 30, 2009 (JP) .................................. 2009-19030

(51) Int. Cl.
*G06F 13/28* (2006.01)

(52) U.S. Cl.
USPC .................. 710/23; 710/22; 710/24; 710/25; 710/26; 710/27; 710/28

(58) Field of Classification Search
None
See application file for complete search history.

(56) References Cited

U.S. PATENT DOCUMENTS

| | | | | |
|---|---|---|---|---|
| 5,438,665 | A * | 8/1995 | Taniai et al. | 710/25 |
| 5,894,560 | A * | 4/1999 | Carmichael et al. | 710/25 |
| 6,401,201 | B2 * | 6/2002 | Fish et al. | 713/2 |
| 6,785,751 | B1 * | 8/2004 | Connor | 710/52 |
| 6,874,039 | B2 * | 3/2005 | Ganapathy et al. | 710/28 |
| 7,155,541 | B2 * | 12/2006 | Ganapathy et al. | 710/24 |
| 7,299,302 | B2 * | 11/2007 | Muro | 710/5 |
| 7,587,663 | B2 * | 9/2009 | Reinhardt et al. | 714/819 |
| 7,970,961 | B2 * | 6/2011 | Ganapathy et al. | 710/22 |
| 2001/0049755 | A1 * | 12/2001 | Kagan et al. | 710/22 |
| 2002/0071386 | A1 * | 6/2002 | Gronke | 370/217 |
| 2002/0165897 | A1 * | 11/2002 | Kagan et al. | 709/102 |
| 2004/0030840 | A1 * | 2/2004 | Hesse et al. | 711/137 |
| 2005/0033874 | A1 * | 2/2005 | Futral et al. | 710/22 |
| 2005/0198410 | A1 * | 9/2005 | Kagan et al. | 710/22 |
| 2005/0289253 | A1 * | 12/2005 | Edirisooriya et al. | 710/22 |
| 2006/0212612 | A1 * | 9/2006 | Takamiya et al. | 710/24 |

FOREIGN PATENT DOCUMENTS

| | | |
|---|---|---|
| JP | 6-96007 | 4/1994 |
| JP | 9-319698 | 12/1997 |
| JP | 2006-259898 | 9/2006 |
| JP | 2007-87086 | 4/2007 |

OTHER PUBLICATIONS

Office Action issued by the Japanese Patent Office on Sep. 4, 2012 in the corresponding Japanese patent application No. 2009-019030.

* cited by examiner

*Primary Examiner* — Henry Tsai
*Assistant Examiner* — Jing-Yih Shyu
(74) *Attorney, Agent, or Firm* — Staas & Halsey LLP

(57) ABSTRACT

An I/O controller and method are provided. The I/O controller to which an I/O device can be connected, and instructs the I/O device to execute a process includes a descriptor transfer device that transfers a descriptor indicating contents of a process to be executed, and execution instruction unit that instructs the I/O device to execute the process, based on the descriptor transferred from the descriptor transfer device, wherein the descriptor transfer device includes a memory for storing the descriptor; descriptor reading unit that reads, according to an indication regarding a descriptor read source from a processor, an indicated descriptor from a main memory or said memory which stores the descriptor, and descriptor transfer unit that transfers the read descriptor to the execution instruction unit.

12 Claims, 8 Drawing Sheets

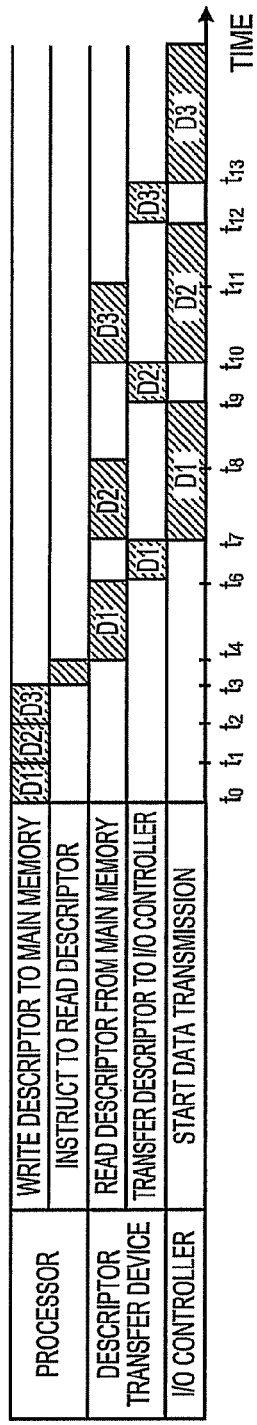
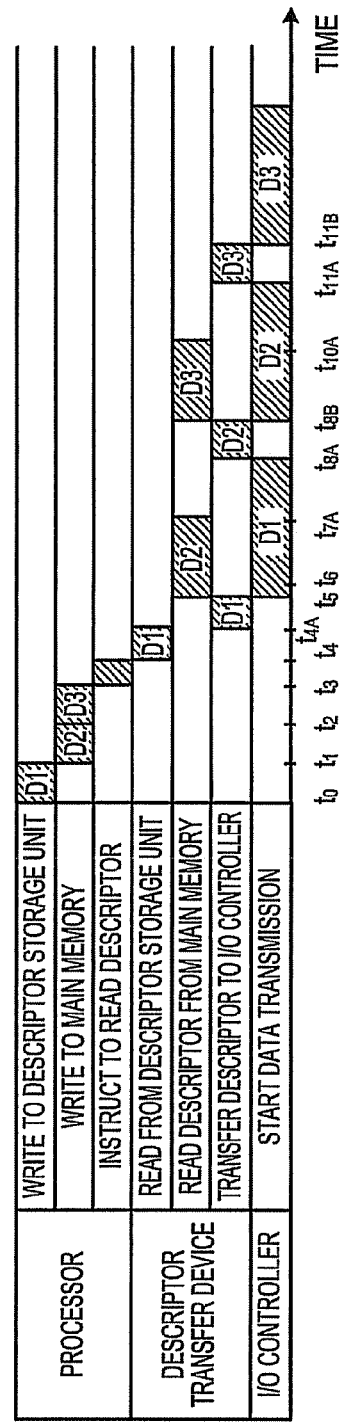
FIG. 2A
FIG. 2B

I/O CONTROLLER AND DESCRIPTOR TRANSFER METHOD

CROSS-REFERENCE TO RELATED APPLICATION

This application is related to and claims priority to Japanese Patent Application No. 2009-19030, filed on Jan. 30, 2009, and incorporated herein by reference

FIELD

The embodiments discussed herein are directed to an I/O controller that controls an I/O device.

BACKGROUND

When an I/O device (Input/Output device) such as a disk device or a network interface performs a data transfer, or packet transmission, for example, a processor in a computer passes a descriptor to an I/O controller which controls the I/O device. The descriptor may include information indicating a kind of a process to be performed by the I/O device, an address of a main memory that is a target of the data transfer and the like. The I/O controller may cause the I/O device to perform an indicated process, based on the information in the descriptor passed from the processor.

In transferring the descriptor to the I/O controller, the processor writes the descriptor to a descriptor storage unit provided in the I/O controller, and transfer the descriptor written to the descriptor storage unit, to the I/O controller. The descriptor storage unit may be a memory unit that is provided separately from the main memory and which can be accessed faster than memory accesses. In addition, the I/O controller may receive a request from the processor, and read the descriptor stored in the main memory.

A data transfer in which a DMA controller sequentially processes a plurality of transfer descriptors included in a TD chain written to a TD chain storage unit by a CPU, and a series of the data transfers between the main memory and the I/O device by direct memory access is proposed.

Conventionally, a processor writes the descriptor to the descriptor storage unit provided in the I/O controller, and then transfers the written descriptor to the I/O controller, latency of transferring the descriptor can be reduced. However, in this method, the I/O controller needs to be provided with the descriptor storage unit having a relatively large capacity.

Moreover, in a method in which the I/O controller receives the request from the processor, and reads the descriptor stored in the main memory, time is required to read the descriptor from the main memory, and thus the latency of transferring the descriptor is increased.

An problem to be addressed is to reduce the latency of transferring the descriptor without increasing a capacity of the memory unit for storing the descriptor.

SUMMARY

It is an aspect of the embodiments discussed herein to provide an I/O controller and descriptor transfer method.

The above aspects can be attained by an I/O controller to which an I/O device may be connected and instructs the I/O device to execute a process includes a descriptor transfer device that transfers a descriptor indicating contents of a process to be executed, and execution instruction unit that instructs the I/O device to execute the process based on the descriptor transferred from the descriptor transfer device, wherein the descriptor transfer device includes a memory for storing the descriptor, descriptor reading unit that reads, according to an indication regarding a descriptor read source from a processor, an indicated descriptor from a main memory or said memory which stores the descriptor, and descriptor transfer unit that transfers the read descriptor to the execution instruction unit.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2A illustrates a descriptor transfer method and FIG. 2B illustrates an exemplary descriptor transfer method with an exemplary descriptor transfer device;

DESCRIPTION OF EMBODIMENTS

Figure 1:
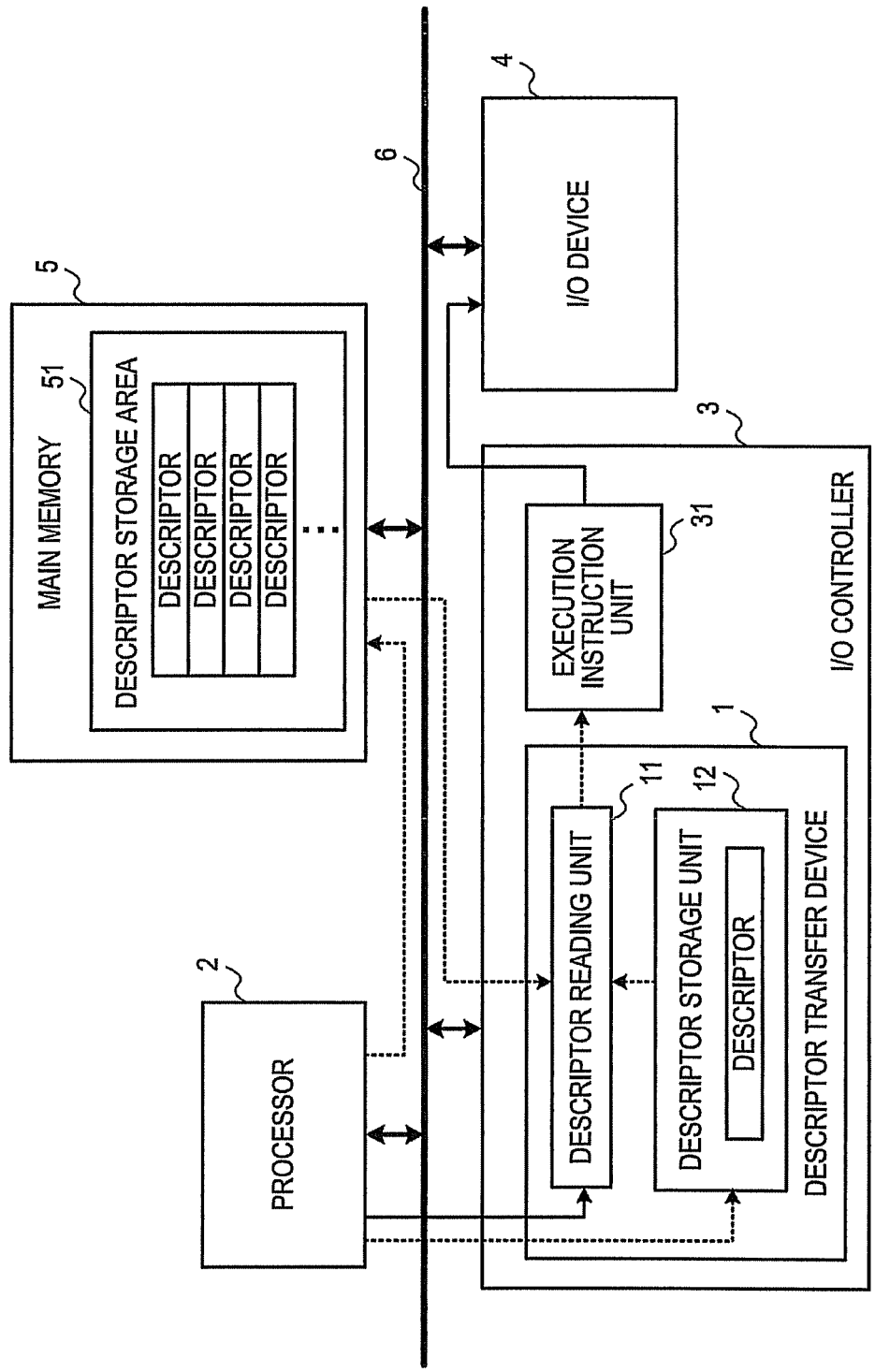
FIG. 1 illustrates an exemplary device configuration.

FIG. 1 illustrates a descriptor transfer device according to an exemplary embodiment. According to an instruction from a processor 2, a descriptor transfer device 1 according to exemplary embodiment reads a descriptor from a main memory 5 or a descriptor storage unit 12, and transfers the read descriptor to an I/O controller 3. The descriptor is information regarding a process to be executed by an I/O device 4, and, for example, include information indicating a kind of the process to be executed by the I/O device 4 and an address of the main memory which is a data transfer target. FIG. 1 illustrates an exemplary I/O controller 3 included with the descriptor transfer device 1. However, the descriptor transfer device 1 may be a device independent of the I/O controller 3.

The processor 2 may store the descriptor in a descriptor storage area 51 of the main memory 5, or in the descriptor storage unit 12 provided in the descriptor transfer device 1, through a path 6, and also indicates a descriptor read source to the descriptor transfer device 1.

The I/O controller 3 instructs the I/O device 4 to execute the process to be executed by the I/O device, which is indicated by the descriptor transferred from the descriptor transfer device 1 through the path 6. An execution instruction unit 31 provided in the I/O controller 3 receives the descriptor transferred from a descriptor reading unit 11 provided in the descriptor transfer device 1, and instructs the I/O device 4 to execute the process corresponding to the transferred descriptor. The I/O device 4 executes the process, for example, as instructed by the I/O controller 3.

The descriptor transfer device 1 illustrated in FIG. 1 includes a descriptor reading unit 11 and a descriptor storage unit 12. The descriptor reading unit 11 reads, for example, according to the indication indicating the descriptor read source received from the processor 2, the descriptor corresponding to the indication, from the main memory 5 or the descriptor storage unit 12 which stores the descriptor. Moreover, the descriptor reading unit 11 functions transfers the read descriptor to the execution instruction unit 31 provided in the I/O controller 3.

The descriptor reading unit 11 may be capable of reading a subsequent descriptor from the read source while the I/O controller 3 instructs the I/O device 4 to execute the process indicated by the descriptor, that is, a prefetch operation.

The descriptor storage unit 12 is a memory unit that may be provided separately from the main memory 5, and which can be accessed faster than memory accesses. The descriptor storage unit 12 stores the descriptor written by the processor 2.

FIG. 2A illustrates a descriptor transfer method FIG. 2B illustrates an exemplary descriptor transfer method with an exemplary descriptor transfer device 1.

FIGS. 2A and 2B illustrate an example in a case where three descriptors, that is, a first descriptor D1 and subsequent descriptors D2 and D3, are transferred to the I/O controller 3. Processor 2 illustrated in FIG. 1 instructs the descriptor transfer device 1 to read the descriptor D1 from the descriptor storage unit 12, and to read the descriptors D2 and D3 from the main memory 5.

FIG. 2A illustrates a processor sequentially writes the descriptors D1 to D3 to the main memory from time t0 to time t3, and the processor instructs the descriptor transfer device to read the descriptors, from time t3 to time t4. The descriptor transfer device reads the descriptor D1 from the main memory from time t4 to time t6, and transfers the read descriptor D1 to the I/O controller from time t6 to time t7. Then, the I/O controller transmits execution instruction data for instructing the execution of the process based on the descriptor D1, to the I/O device from time t7 to time t9.

The descriptor transfer device reads the descriptor D2 from the main memory from time t7 to time t8, and transfers the read descriptor D2 to the I/O controller from time t9 to time t10. On the other hand, the I/O controller transmits the execution instruction data based on the descriptor D2 to the I/O device from time t10 to time t12.

Moreover, the descriptor transfer device reads the descriptor D3 from the main memory from time t10 to time t11, and transfers the read descriptor D3 to the I/O controller from time t12 to time t13. Subsequently, the I/O controller transmits the execution instruction data based on the descriptor D3 to the I/O device.

On the other hand, as illustrated in FIG. 2B, according to an exemplary embodiment, the processor 2, as illustrated in FIG. 1, for example, writes the descriptor D1 to the descriptor storage unit 12 from time t0 to time t1 for example, and writes the descriptors D2 and D3 to the main memory 5 from time t1 to time t3. The processor 2 instructs the descriptor transfer device 1 to read the descriptors, from time t3 to time t4.

The processor 2 instructs the descriptor transfer device 1 to read the descriptor D1 from the descriptor storage unit 12, and also, to read the descriptors D2 and D3 from the main memory 5.

The descriptor transfer device 1 reads the descriptor D1 from the descriptor storage unit 12 from time t4 to time t4A, and transfers the read descriptor D1 to the I/O controller 3 from time t4A to time t5. On the other hand, the I/O controller 3 transmits the execution instruction data for instructing the execution of the process based on the descriptor D1, to the I/O device 4 from time t5 to time t8A.

Descriptor transfer device 1 reads the descriptor D2 from the main memory from time t5 to time t7A, and transfers the read descriptor D2 to the I/O controller 3 from time t8A to time t8B. The I/O controller 3 transmits the execution instruction data based on the descriptor D2 to the I/O device 4 from time t8B to time t11A.

The descriptor transfer device 1 reads the descriptor D3 from the main memory from time t8B to time t10A, and transfers the read descriptor D3 to the I/O controller 3 from time t11A to time t11B. The I/O controller 3 transmits the execution instruction data based on the descriptor D3 to the I/O device 4.

According to an exemplary embodiment, a time period, from when the processor 2 issues the instruction for reading the descriptor D1 to when the I/O controller 3 starts the transmission of the execution instruction data, is reduced by a time period of t7-t5, in comparison with the example illustrated in FIG. 2A. In other words, in an exemplary embodiment, since a processor 2 instructs a descriptor transfer device 1 to read a first descriptor D1 from a descriptor storage unit 12, which can be accessed faster than the main memory, latency of transferring the descriptor can be reduced in comparison with the example of FIG. 2A in which the descriptor D1 is read from the main memory.

Moreover, in an exemplary embodiment, the descriptor transfer device 1 reads the descriptor D2 subsequent to the descriptor D1, from the main memory 5, while the I/O controller 3 transmits the execution instruction data based on the first descriptor D1. Therefore, latency of reading the memory can be hidden. As a result thereof, the embodiment can further reduce the latency of transferring the descriptor.

Moreover, in an exemplary embodiment, the processor 2 writes the descriptors D2 and D3 subsequent to D1, to the main memory 5. Thus, only a small capacity of the descriptor storage unit 12 is required for storing the descriptor, and also, the processor 2 does not have to wait for the descriptor to be written, until a free area is secured in the descriptor storage unit 12.

Figure 3:
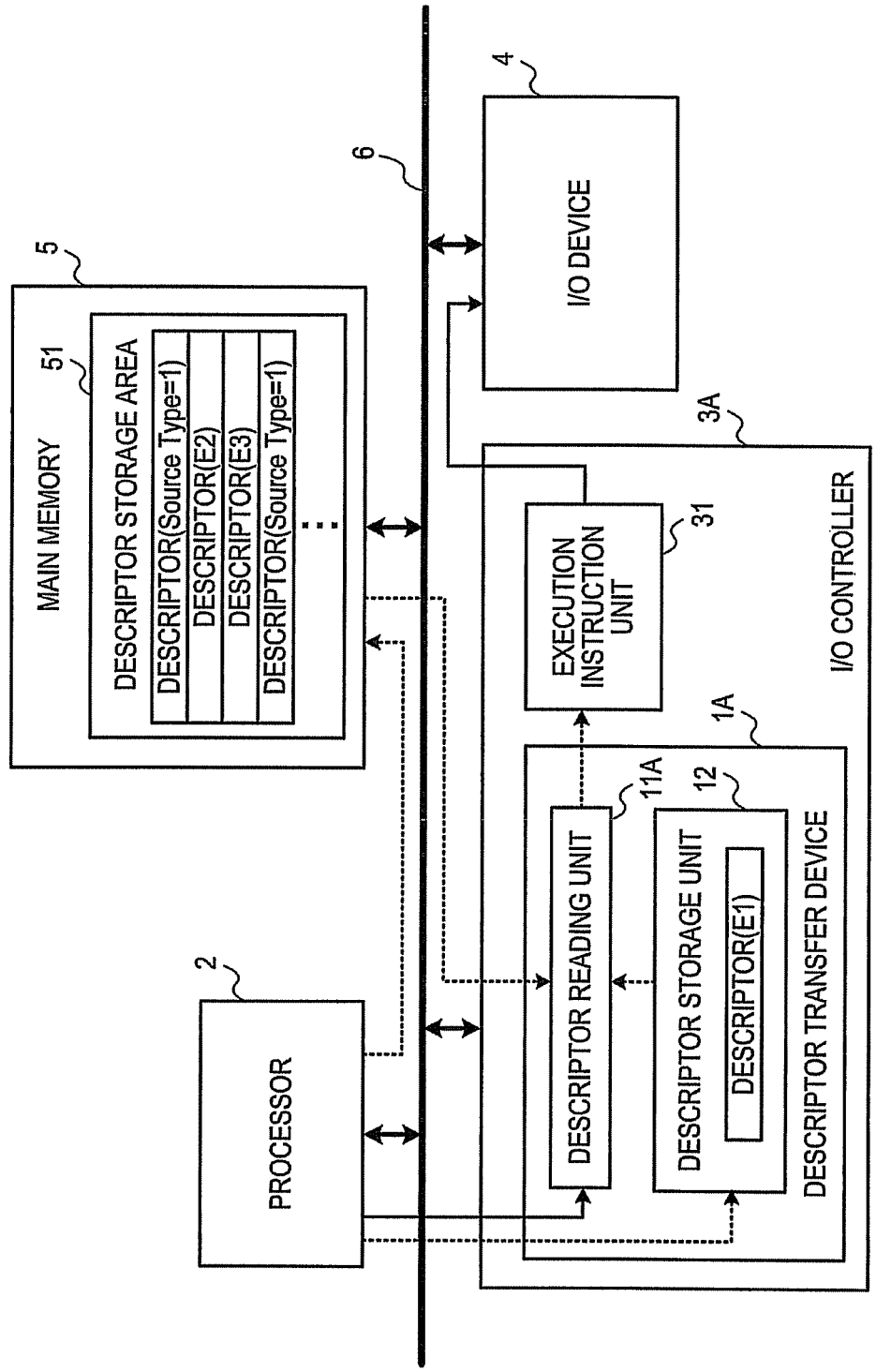
FIG. 3 illustrates an exemplary embodiment.

FIG. 3 illustrates a first exemplary embodiment. In the first embodiment, the processor 2 writes the descriptor along with Source Type corresponding to the descriptor (for example, Source Type=1 illustrated in FIG. 3), to the descriptor storage area 51 of the main memory 5. The processor 2 instructs a descriptor transfer device 1A to read the descriptor from the main memory 5. "Source Type=1" indicates that a value of Source Type is 1.

A descriptor reading unit 11A provided in the descriptor transfer device 1A reads the descriptor from the main memory 5, and obtains Source Type of the read descriptor. Based on the value of obtained Source Type, for example, the descriptor reading unit 11A in the descriptor transfer device 1A determines whether to transfer the read descriptor to an I/O controller 3A, or to wait for the read descriptor to be written to the descriptor storage unit 12 and then transfer the descriptor written to the descriptor storage unit 12, to the I/O controller 3A.

"Source Type" is a flag indicating the descriptor read source, and is stored in a predetermined field for storing Source Type.

A descriptor E1 written to the descriptor storage unit 12 illustrated in FIG. 3 is a first descriptor to be transferred to the I/O controller 3A, and E2 and E3 are descriptors subsequent to E1. In the first embodiment, it is assumed that the value of Source Type corresponding to each of E1, E2 and E3 is "0".

Figure 4:
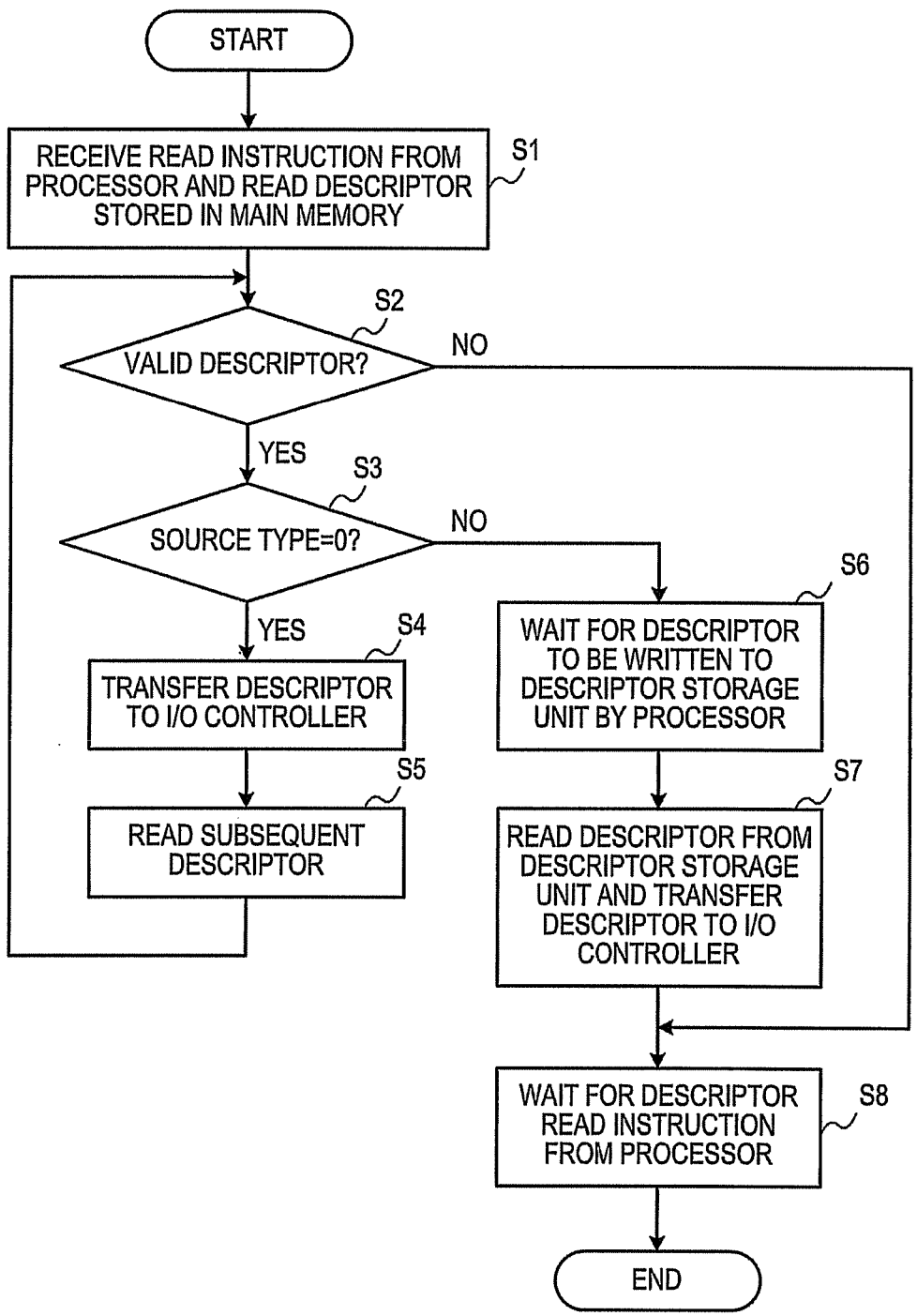
FIG. 4 illustrates exemplary operations and processing in a descriptor transfer device.

FIG. 4 illustrates exemplary operations and processing in the descriptor transfer device in an exemplary embodiment. In the first embodiment, when the descriptor transfer device 1A receives the descriptor read instruction from the processor 2, the descriptor transfer device 1A reads the descriptor from the main memory 5. Based on Source Type of the descriptor read from the main memory 5, the descriptor transfer device 1A determines whether to transfer the read descriptor to the I/O controller 3A, or to wait for the descriptor to be written to the descriptor storage unit 12 by the processor 2 without transferring the read descriptor to the I/O controller 3A.

If the descriptor transfer device 1A has determined that Source Type of the descriptor read from the main memory 5 is not "0", the descriptor transfer device 1A determines that the read source of the descriptor to be transferred is the descriptor storage unit 12, and waits for the descriptor to be written to the descriptor storage unit 12 by the processor 2. In response to the descriptor being written to the descriptor storage unit 12, the descriptor transfer device 1A reads the written descriptor from the descriptor storage unit 12.

On the other hand, if the descriptor transfer device 1A has determined that Source Type of the descriptor read from the main memory 5 is "0", the descriptor transfer device 1A determines that the descriptor to be transferred is the descriptor read from the main memory 5, that is, determines that the descriptor read source is the main memory 5, and transfers the read descriptor to the I/O controller 3A.

The descriptor reading unit 11A receives the descriptor read instruction from the processor 2, and, for example, based on a pointer indicating a storage position of the descriptor, which is included in the unit itself, reads the descriptor stored in the descriptor storage area 51 of the main memory 5 (S1). The descriptor reading unit 11A determines whether the read descriptor is a valid descriptor (S2). The descriptor reading unit 11A determines whether the descriptor storage area 51 from which the descriptor has been read in S1 is an area to which the processor 2 has written the descriptor, and based on a result of the determination, determines whether the read descriptor is the valid descriptor.

If the descriptor reading unit 11A has determined that the descriptor has been read in S1 from an area to which the processor 2 has not written, the descriptor reading unit 11A determines that the read descriptor is not the valid descriptor, and the process proceeds to S8. On the other hand, if the descriptor reading unit 11A has determined that the descriptor has been read in S1 from the area to which the processor 2 has written, the descriptor reading unit 11A determines that the read descriptor is the valid descriptor, and the process proceeds to S3.

The descriptor reading unit 11A determines whether Source Type of the descriptor read in S1 is "0" (S3). If the descriptor reading unit 11A has determined that Source Type of the descriptor is "0", the descriptor reading unit 11A determines that the read source of the descriptor to be transferred is the main memory 5. The descriptor reading unit 11A confirms that the I/O controller 3A is not processing the descriptor, that is, the I/O controller 3A is not performing a process for transmitting the execution instruction data based on the descriptor, and then, transfers the descriptor read in S1 to the I/O controller 3A (S4).

If the descriptor reading unit 11A has confirmed that the I/O controller 3A is processing the descriptor, the descriptor reading unit 11A retains the descriptor until the I/O controller 3A terminates the descriptor processing.

The descriptor reading unit 11A updates the pointer indicating the storage position of the descriptor, and reads the subsequent descriptor which has been written to the descriptor storage area 51 of the main memory (S5), and the process returns to S2.

In S3, if the descriptor reading unit 11A has determined that Source Type of the descriptor is not "0", the descriptor reading unit 11A determines that the read source of the descriptor to be transferred is the descriptor storage unit 12. In other words, the descriptor reading unit 11A waits for the descriptor to be written to the descriptor storage unit 12 by the processor 2 without transferring the descriptor read in S1 to the I/O controller (S6).

In response to the descriptor being written to the descriptor storage unit 12, the descriptor reading unit 11A reads the descriptor from the descriptor storage unit 12, and transfers the descriptor to the I/O controller 3A (S7). The descriptor reading unit 11A waits for the descriptor read instruction from the processor 2 (S8).

Figure 5:
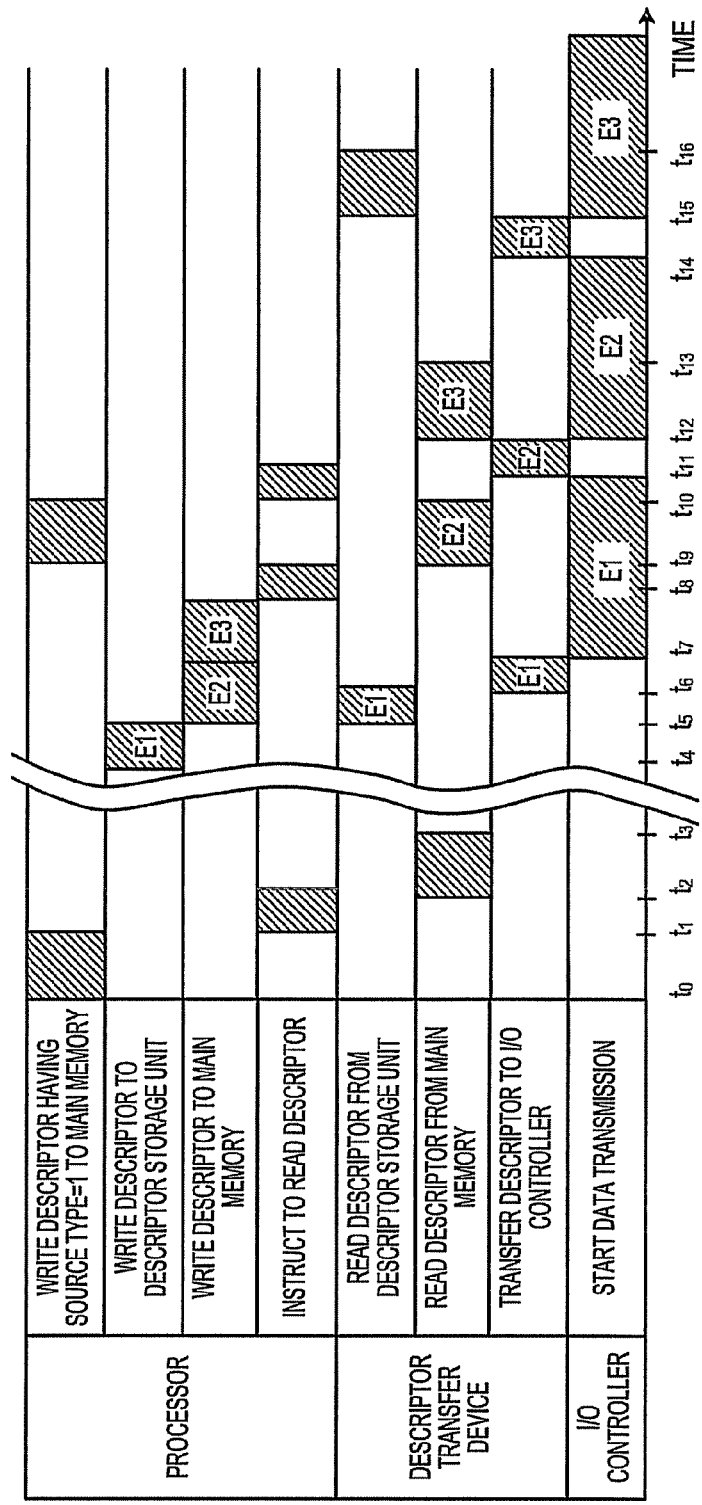
FIG. 5 illustrates an exemplary descriptor transfer processing sequence.

FIG. 5 illustrates an exemplary descriptor transfer processing sequence. The processor 2 illustrated in FIG. 3, for example, writes the descriptor having Source Type of 1 to the main memory 5 from time t0 to time t1, and instructs the descriptor transfer device 1A to read the descriptor, from time t1 to time t2. The descriptor reading unit 11A in the descriptor transfer device 1A, which has received the read instruction, reads the descriptor from the main memory 5 from time t2 to time t3. If the descriptor reading unit 11A has determined that Source Type of the read descriptor is "1", that is, Source Type is not "0", the descriptor reading unit 11A waits for the descriptor to be written to the descriptor storage unit 12 by the processor 2 as described above, based on the process, for example, illustrated in S6 of FIG. 4.

When the processor 2 writes the first descriptor E1 to the descriptor storage unit 12 from time t4 to time t5, the descriptor reading unit 11A starts reading the descriptor E1 from the descriptor storage unit 12 at time t5 which is the time when the write of the descriptor E1 has been terminated. The descriptor reading unit 11A transfers the descriptor E1 to the I/O controller 3A from time t6 to time t7. The I/O controller 3A transmits data for instructing the execution of the process based on the descriptor E1, that is, the execution instruction data, to the I/O device 4 from time t7 to time t11.

For E2 and E3 which are the descriptors subsequent to the descriptor E1, the processor 2 writes the descriptor E2 and E3 to the main memory 5 from time t5 to time t8, and instructs the descriptor transfer device 1A to read the descriptors, from time t8 to time t9. The descriptor reading unit 11A in the descriptor transfer device 1A, which has received the read instruction, reads the descriptor E2 from the main memory 5 from time t9 to time t10. The descriptor reading unit 11A determines that Source Type of the read descriptor E2 is "0", and transfers the descriptor E2 to the I/O controller 3A from time t11 to time t12. The I/O controller 3A transmits the execution instruction data based on the descriptor E2 to the I/O device 4 from time t12 to time t14.

The descriptor reading unit 11A reads the descriptor E3 from the main memory 5 from time t12 to time t13. The descriptor reading unit 11A determines that Source Type of the read descriptor E3 is "0", and transfers the descriptor E3 to the I/O controller 3A from time t14 to time t15. Then, the I/O controller 3A starts the transmission of the execution instruction data based on the descriptor E3 to the I/O device 4 at time t15.

On the other hand, as illustrated in FIG. 5, the processor 2 writes the descriptor having Source Type of "1" to the main memory 5 from time t9 to time t10, and instructs the descriptor transfer device 1A to read the descriptor, from time t10 to time t11. The descriptor reading unit 11A in the descriptor transfer device 1A, which has received the read instruction, reads the descriptor from the main memory 5 from time t15 to time t16, and if the descriptor reading unit 11A has determined that Source Type of the read descriptor is not "0", the descriptor reading unit 11A waits for the descriptor to be written to the descriptor storage unit 12.

In an exemplary first embodiment described with reference to FIGS. 3 to 5, the processor 2 writes the descriptor having Source Type to the main memory 5, and then instructs the descriptor transfer device 1A to read the descriptor from the main memory 5. If the descriptor transfer device 1A has determined that Source Type of the descriptor read from the main memory 5 is not "0", the descriptor transfer device 1A waits for the descriptor to be written to the descriptor storage unit 12 by the processor 2, and in response to the descriptor being written to the descriptor storage unit 12, the descriptor transfer device 1A reads the written descriptor from the descriptor storage unit 12.

Therefore, for example, it is possible to always read the first descriptor from the descriptor storage unit 12 by writing the descriptor having the value of Source Type of "1" to the main memory 5 by the processor 2, thereby putting the descriptor transfer device 1A into a waiting state, and then writing the first descriptor to the descriptor storage unit 12. In other words, according to a first embodiment, the descriptor transfer device 1A can be set to read a desired descriptor from the descriptor storage unit 12.

The value of Source Type corresponding to the descriptor is not limited to "0" or "1", and an arbitrary number of kinds of Source Type and an arbitrary value of Source Type may be employed. Moreover, it may be previously decided which address of the descriptor storage unit 12 the descriptor is read from, depending on the value of Source Type.

For example, the processor 2 may write the descriptors having Source Type of "2", "3" and "4", respectively, to the main memory 5, and then may instruct the descriptor transfer device 1A to read the descriptor, and the descriptor transfer device 1A may read the descriptor from the address of the descriptor storage unit 12 depending on the value of Source Type of the descriptor read from the main memory 5.

Figure 6:
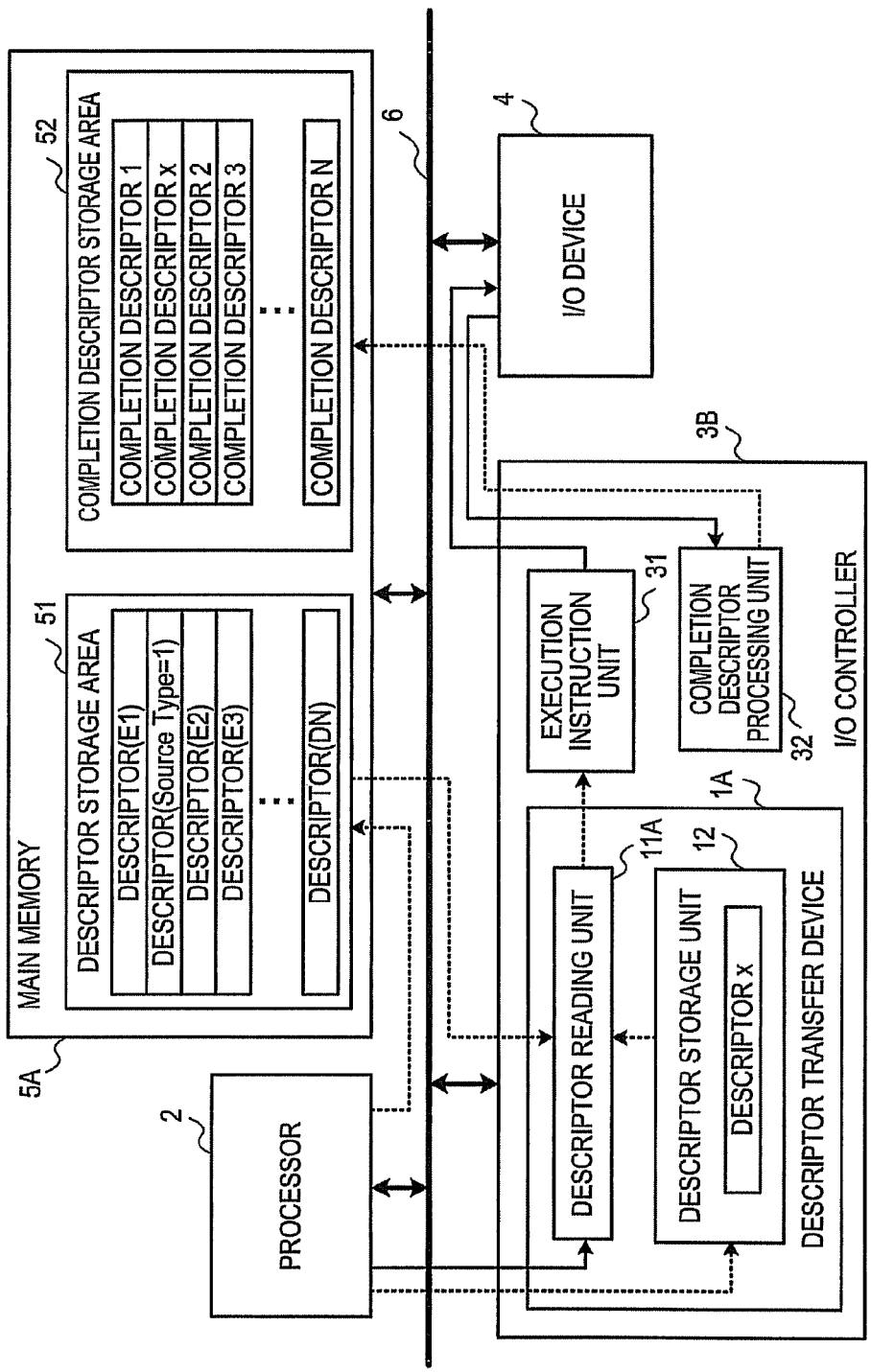
FIG. 6 illustrates a second exemplary embodiment.

FIG. 6 illustrates an exemplary second embodiment. Among processing units illustrated in FIG. 6, descriptions of the similar processing units, assigned the same reference characters as the processing units illustrated in FIG. 3, are omitted.

In a second exemplary embodiment, according to the descriptor transfer method similar to the first embodiment, the descriptor transfer device 1A transfers the descriptor read from a main memory 5A or the descriptor storage unit 12, to the I/O controller 3B.

The processor 2 writes the descriptor having Source Type to the descriptor area 51 of the main memory 5A, and then instructs the descriptor transfer device 1A to read the descriptor from the main memory 5A.

For example, if the descriptor reading unit 11A is set to read the descriptor from the descriptor storage unit 12, the processor 2 writes the descriptor having Source Type which is not "0" (for example, which is "1") to the descriptor storage area 51 on the main memory 5A. For example, if the descriptor reading unit 11A in the descriptor transfer device 1A has determined that Source Type of the descriptor read from the main memory 5A is not "0", the descriptor reading unit 11A waits for the descriptor to be written to the descriptor storage unit 12 by the processor 2. In response to the descriptor being written to the descriptor storage unit 12, the descriptor reading unit 11A reads the descriptor written to the descriptor storage unit 12, from the descriptor storage unit 12, and transfers the descriptor to an I/O controller 3B.

If the descriptor reading unit 11A has determined that Source Type of the descriptor read from the main memory 5A is "0", the descriptor reading unit 11A transfers the read descriptor to the I/O controller 3B. The I/O controller 3B transmits the execution instruction data based on the transferred descriptor to the I/O device 4.

In a second exemplary embodiment, a completion descriptor storage area 52 is provided on the main memory 5A. When the I/O device 4 completes the execution of the process indicated by the execution instruction data transmitted from the execution instruction unit 31, the I/O device 4 notifies a completion descriptor processing unit 32 of the completion of the process. The completion descriptor processing unit 32 provided in the I/O controller 3B writes information indicating that the process has been completed by the I/O device 4, as completion descriptor information, to the completion descriptor storage area 52 on the main memory 5A. The completion descriptor information may include information indicating that the execution of the process indicated by the descriptor, that is, the process indicated by the execution instruction data which is transmitted to the I/O device 4 by the execution instruction unit 31, has been completed.

For example, as illustrated in FIG. 6, when the execution of the process indicated by the descriptor E1 written to the descriptor storage area 51 on the main memory 5A is completed, the completion descriptor processing unit 32 writes a completion descriptor 1 which is information indicating the completion of the execution of the process indicated by the descriptor E1, to the completion descriptor storage area 52.

If the descriptor reading unit 11A has read the descriptor having Source Type of "0" in the main memory 5A illustrated in FIG. 6, from the main memory 5A, for example, the descriptor reading unit 11A waits for a descriptor x to be written to the descriptor storage unit 12, then reads the descriptor x, and transfers the descriptor x to the I/O controller 3B. When the I/O device 4 completes the execution of the process indicated by the transferred descriptor x, the completion descriptor processing unit 32 in the I/O controller 3B writes a completion descriptor x which is information indicating that the execution of the process indicated by the descriptor x has been completed, to the completion descriptor storage area 52 on the main memory 5A, as illustrated in FIG. 6.

In a second embodiment, each time the process indicated by the descriptor is completed, the completion descriptor information is written to the completion descriptor storage area on the main memory 5A. Therefore, according to the second embodiment example, the descriptor indicating the process is associated with information indicating whether the execution of the process has been completed. As a result thereof, it is possible to easily know which descriptor the completed process is indicated by.

Figure 7:
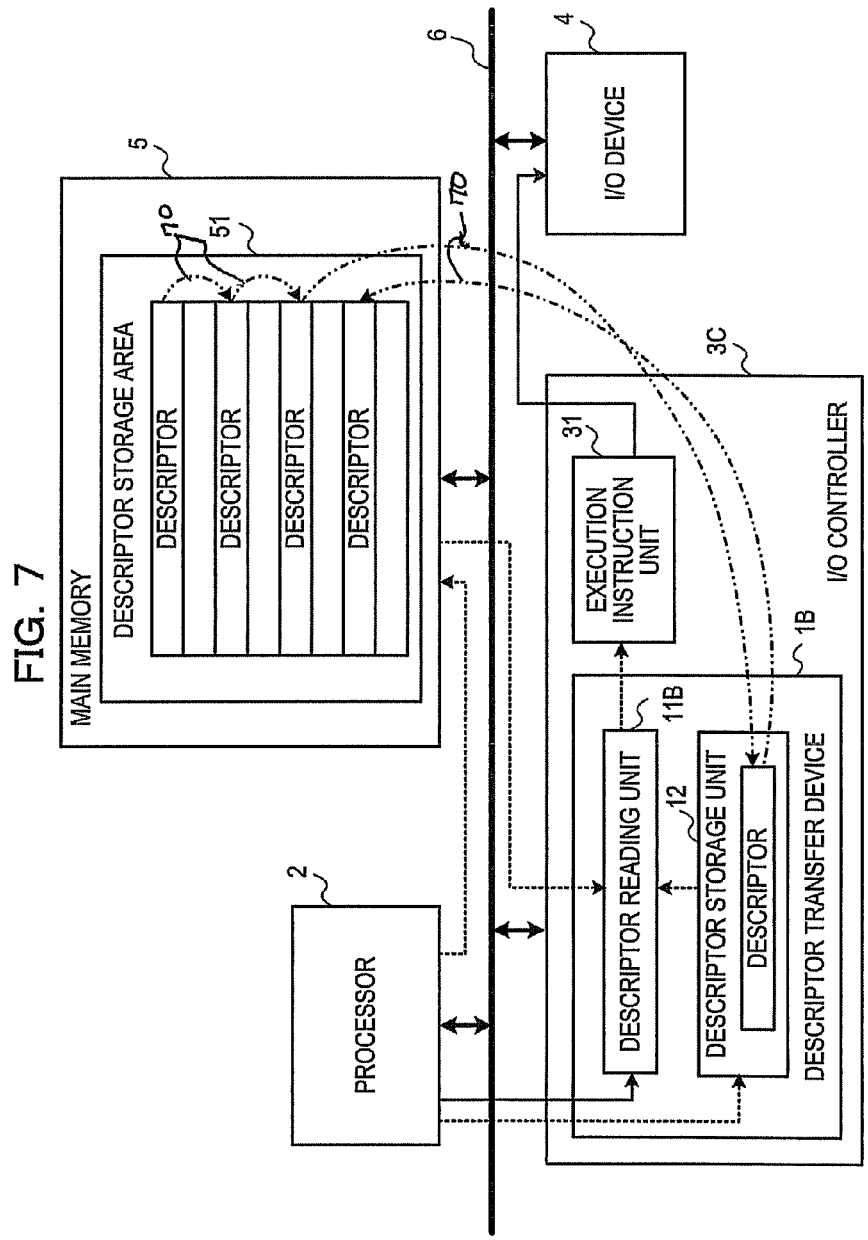
FIG. 7 illustrates a third exemplary embodiment.

FIG. 7 illustrates a third exemplary embodiment. Among the processing units illustrated in FIG. 7, descriptions of similar processing units assigned with the same reference characters as the processing units illustrated in FIG. 3 are omitted. In a third exemplary embodiment, the descriptor which is written to the main memory 5 or the descriptor storage unit 12 includes a pointer to a descriptor to be read next to the descriptor itself. Based on the pointer included in the descriptor, a descriptor reading unit 11B determines the read source of the descriptor to be read next, and based on a result of the determination, sequentially reads the descriptor to be read next, from the read source, as illustrated by a chain double-dashed arrow 70 illustrated in FIG. 7.

When the processor 2 writes the descriptor to the main memory 5 or the descriptor storage unit 12, the pointer to the descriptor to be read next is stored in a field included in each descriptor, for example, a next_ptr field. This pointer indicates which area of the descriptor storage unit 12 or the main memory 5 the descriptor to be read next has been written to.

The descriptor reading unit 11B provided in a descriptor transfer device 1B determines whether the next descriptor has been written to the descriptor storage unit 12 or to the main memory 5, based on the pointer stored in the next_ptr field of the descriptor read from the main memory 5 or the descriptor storage unit 12. Based on a result of the determination, the descriptor reading unit 11B reads the next descriptor from the descriptor storage unit 12 or the main memory 5.

Figure 8:
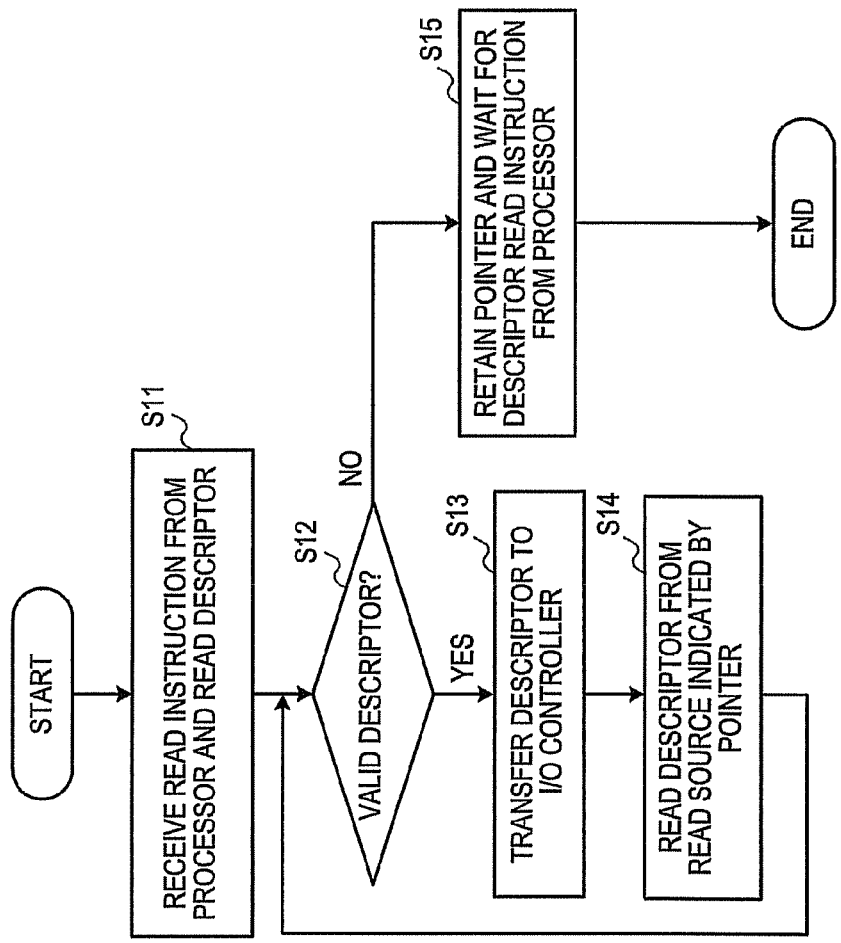
FIG. 8 illustrates operations and processing in a descriptor reading unit.

FIG. 8 illustrates exemplary operations and processing in the descriptor reading unit in a third embodiment. When the descriptor reading unit 11B receives the descriptor read instruction from the processor 2, the descriptor reading unit 11B reads the descriptor from the read source (the main memory 5 or the descriptor storage unit 12) indicated by the pointer retained in the unit itself (S11). An initial value of this pointer may be previously set to the processor 2.

The descriptor reading unit 11B determines whether the read descriptor is valid (S12). The descriptor reading unit 11B determines whether an area from which the descriptor has been read in S11 is the area to which the processor 2 has written, and based on a result of the determination, determines whether the read descriptor is the valid descriptor.

The descriptor reading unit 11B confirms that an I/O controller 3C is not processing the descriptor, that is, the I/O controller 3C is not performing the process for transmitting the execution instruction data based on the descriptor, and then, transfers the read descriptor to the I/O controller 3C (S13). If the descriptor reading unit 11B has confirmed that the I/O controller 3C is processing the descriptor, the descriptor reading unit 11B retains the descriptor in a predetermined memory unit until the I/O controller 3C terminates the descriptor processing.

The descriptor reading unit 11B reads the descriptor from the read source indicated by the pointer stored in the next_ptr field of the descriptor read in S11 (S14), and the process returns to S12.

If the descriptor reading unit 11B has determined in S12 that the read descriptor is the descriptor which is not valid, the descriptor reading unit 11B retains the pointer stored in the next_ptr field of the descriptor which has been determined to be not valid, and waits for the descriptor read instruction from the processor 2 (S15). Then, when the descriptor reading unit 11B receives a next descriptor read instruction from the processor 2, the descriptor reading unit 11B reads the descriptor from the read source indicated by the retained pointer.

In a third exemplary embodiment, since the descriptor has the pointer to the next descriptor, it is not necessary to write the descriptor to continuous memory areas of the descriptor storage unit 12 or the main memory 5. Moreover, since the pointer designates whether the descriptor is read from the main memory 5 or from the descriptor storage unit 12, the descriptor read source can be switched. For example, the descriptor reading unit 11B can read the descriptor in the descriptor storage unit 12 without accessing the main memory 5, by setting the initial value of the pointer retained in the descriptor reading unit 11B, to indicate the descriptor storage unit 12.

In the descriptor transfer device, the I/O controller and the descriptor transfer method, if the indication regarding the descriptor read source from the processor indicates the read of the descriptor from the memory unit which has been provided separately from the main memory and which can be accessed fast, the descriptor transfer device reads the descriptor from the memory unit and transfers the descriptor to the I/O controller. Thus, the latency of transferring the descriptor can be reduced without increasing a capacity of the memory unit.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc—Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An I/O controller to which an I/O device can be connected, and instructs the I/O device to execute a process, the I/O controller comprising:

a descriptor transfer device that transfers one or more descriptors indicating contents of one or more processes to be executed, the descriptor transfer device being connected to a processor that instructs the I/O device to execute the one or more processes based on the one or more descriptors transferred from the descriptor transfer device and connected to a main memory that stores information that is used by the processor, the processor writing the one or more descriptors to the main memory such that a first one of the one or more descriptors includes first source type information and subsequent ones of the one or more descriptors include second source type information; and an execution instruction unit that instructs the I/O device to execute the process, based on the one or more descriptors transferred from the descriptor transfer device, wherein the descriptor transfer device includes:
a memory unit configured to store the one or more descriptors; and
a descriptor reading unit that reads the one or more descriptors from the main memory and transfers the read one or more descriptors to the execution instruction unit, wherein the descriptor reading unit transfers the read one or more descriptors including the second source type information from the main memory directly to the execution instruction unit, and first writes the read first one of the one or more descriptors including the first source type information to the memory unit and then transfers the first one of the one or more descriptors to the execution instruction unit.

2. The I/O controller according to claim 1, further comprising:
a completion descriptor processing unit that sets information indicating that the I/O device has completed the process indicated by the read descriptor, in the main memory.

3. A descriptor transfer method for a descriptor transfer device transferring one or more descriptors each indicating contents of a process to be executed, to an I/O controller which instructs an I/O device to execute the process, the method comprising:
writing the one or more descriptors to a main memory, a first one of the one or more descriptors including first source type information and subsequent ones of the one or more descriptors including second source type information;
reading the one or more descriptors from the main memory; and
transferring the read one or more descriptors to an execution instruction unit of the I/O controller arranged to instruct the I/O device to execute the process based on the transferred one or more descriptors, wherein
the read one or more descriptors including the second source type information are transferred from the main memory directly to the execution instruction unit, and the read first one of the one or more descriptors including the first source type information is first written to a memory unit of the descriptor transfer device and then transferred to the execution instruction unit.

4. The descriptor transfer method according to claim 3, further comprising:
setting information indicating that the I/O device has executed the process indicated in the read descriptor which has been transferred to the I/O controller, in the main memory.

5. The descriptor transfer method according to claim 3, wherein
each of the one or more descriptors stored in the main memory includes a pointer to a descriptor to be read next to the descriptor itself.

6. A computer, comprising:
an I/O controller configured to be connected to an I/O device, the I/O controller being configured to instruct the I/O device to execute one or more processes;
a descriptor transfer device that transfers one or more descriptors indicating contents of the one or more processes to be executed;
a processor that instructs the I/O device to execute the one or more processes based on the one or more descriptors transferred from the descriptor transfer device; and
a main memory that stores information that is used by the processor, wherein
the processor writes the one or more descriptors to the main memory such that a first one of the one or more descriptors includes first source type information and subsequent ones of the one or more descriptors include second source type information, and
the descriptor transfer device includes:
a memory unit configured to store the one or more descriptors; and
a descriptor reading unit that reads the one or more descriptors from the main memory and transfers the read one or more descriptors to an execution instruction unit of the I/O controller, wherein the descriptor reading unit transfers the read one or more descriptors including the second source type information from the main memory directly to the execution instruction unit, and first writes the read first one of the one or more descriptors including the first source type information to the memory unit and then transfers the first one of the one or more descriptors to the execution instruction unit.

7. The computer according to claim 6, wherein
the I/O controller further includes an execution instruction unit for instructing said I/O device to execute the process based on the read descriptor,
the descriptor transfer device is provided in the I/O controller, and
the descriptor transfer device transfers the read descriptor to the execution instruction unit.

8. The computer according to claim 6, wherein
a pointer indicating a memory location of a subsequent descriptor is included in the read descriptor, and
the descriptor reading unit reads the subsequent descriptor with reference to the pointer included in the read descriptor.

9. A computer, comprising:
an I/O controller to be connected to an I/O device, the I/O controller being configured to instruct the I/O device to execute one or more processes and to transfer one or more descriptors indicating contents of the one or more processes to be executed;
a processor that instructs the I/O device to execute the one or more processes based on the one or more descriptors transferred from the I/O controller; and
a main memory that stores information that is used by the processor, wherein
the processor writes the one or more descriptors to the main memory such that a first one of the one or more descriptors includes first source type information and subsequent ones of the one or more descriptors include second source type information,
the I/O controller includes a memory unit configured to store the one or more descriptors,
the I/O controller reads the one or more descriptors from the main memory and transfers the read one or more descriptors to the I/O controller, and
the I/O controller transfers the read one or more descriptors including the second source type information from the main memory directly to the I/O controller, and first writes the read first one of the one or more descriptors including the first source type information to the memory unit and then transfers the first one of the one or more descriptors to the I/O controller.

10. The computer according to claim 9, wherein
the I/O controller reads a preceding descriptor stored in the memory unit depending on the indication from the processor, and subsequently reads a subsequent descriptor stored in the main memory.

11. The computer according to claim 9, wherein
a pointer indicating a memory location of the subsequent descriptor is included in the read descriptor, and reads the subsequent descriptor with reference to the pointer included in the read descriptor.

12. The computer according to claim 9, wherein
information indicating a descriptor read source is included in the read descriptor, and determines whether to transfer the read descriptor to the I/O controller, or to wait for the descriptor to be written to the memory unit by the processor with reference to the information included in the read descriptor.

* * * * *

UNITED STATES PATENT AND TRADEMARK OFFICE
CERTIFICATE OF CORRECTION

PATENT NO. : 8,589,601 B2
APPLICATION NO. : 12/632368
DATED : November 19, 2013
INVENTOR(S) : Hiramoto et al.

Page 1 of 1

It is certified that error appears in the above-identified patent and that said Letters Patent is hereby corrected as shown below:

In the Specifications

In Column 1, Line 9, Delete "reference" and insert -- reference. --, therefor.

Signed and Sealed this
Twenty-fifth Day of March, 2014

Michelle K. Lee
*Deputy Director of the United States Patent and Trademark Office*